(12) United States Patent
Otohata

(10) Patent No.: US 10,930,919 B2
(45) Date of Patent: Feb. 23, 2021

(54) METHOD OF MANUFACTURING BATTERY ELECTRODE AND ELECTRODE MANUFACTURING APPARATUS

(71) Applicant: NEC Corporation, Tokyo (JP)

(72) Inventor: Makihiro Otohata, Tokyo (JP)

(73) Assignee: NEC CORPORATION, Tokyo (JP)

(*) Notice: Subject to any disclaimer, the term of this patent is extended or adjusted under 35 U.S.C. 154(b) by 173 days.

(21) Appl. No.: 16/087,379

(22) PCT Filed: Mar. 21, 2017

(86) PCT No.: PCT/JP2017/011164
§ 371 (c)(1),
(2) Date: Sep. 21, 2018

(87) PCT Pub. No.: WO2017/169970
PCT Pub. Date: Oct. 5, 2017

(65) Prior Publication Data
US 2019/0103598 A1    Apr. 4, 2019

(30) Foreign Application Priority Data
Mar. 30, 2016   (JP) .............................. JP2016-068340

(51) Int. Cl.
| H01M 4/04 | (2006.01) |
| H01M 4/139 | (2010.01) |
| H01M 4/62 | (2006.01) |
| H01M 4/66 | (2006.01) |
| H01M 4/70 | (2006.01) |

(52) U.S. Cl.
CPC ......... *H01M 4/0404* (2013.01); *H01M 4/139* (2013.01); *H01M 4/62* (2013.01); *H01M 4/661* (2013.01); *H01M 4/70* (2013.01)

(58) Field of Classification Search
None
See application file for complete search history.

(56) References Cited

FOREIGN PATENT DOCUMENTS

| CN | 105283999 A | 1/2016 |
| JP | 09-237622 A | 9/1997 |
| JP | 2001-110408 A | 4/2001 |
| JP | 2003-045491 A | 2/2003 |

(Continued)

OTHER PUBLICATIONS

International Search Report of PCT/JP2017/011164 dated Jun. 20, 2017 [PCT/ISA/210].

(Continued)

*Primary Examiner* — Tracy M Dove
(74) *Attorney, Agent, or Firm* — Sughrue Mion, PLLC

(57) ABSTRACT

A method of manufacturing an electrode, comprising the steps of: forming a first layer by intermittently applying a layer to a current collecting foil with thickness of 40 µm or more and 300 µm or less; and forming a second layer, wherein the second layer is formed both on a region where the first layer has been formed on the current collecting foil and an exposed region where the current collecting foil is exposed without being formed the first layer; wherein in the step of forming of second layer, providing a gap of 40 µm or more between a applying part of application apparatus and the current collecting foil, based on a positional information of the first layer, from during applying a layer to the exposed region to during applying a layer to the first layer.

8 Claims, 17 Drawing Sheets

(56) References Cited

FOREIGN PATENT DOCUMENTS

| | | |
|---|---|---|
| JP | 2004-103437 A | 4/2004 |
| JP | 2007066744 A | 3/2007 |
| JP | 2014-139887 A | 7/2014 |
| JP | 2015-060698 A | 3/2015 |
| JP | 2016-115576 A | 6/2016 |
| JP | 2016-197547 A | 11/2016 |
| WO | 2014/155808 A1 | 10/2014 |

OTHER PUBLICATIONS

Communication dated Nov. 11, 2020, from the China National Intellectual Property Administration in Application No. 201780020536.1.

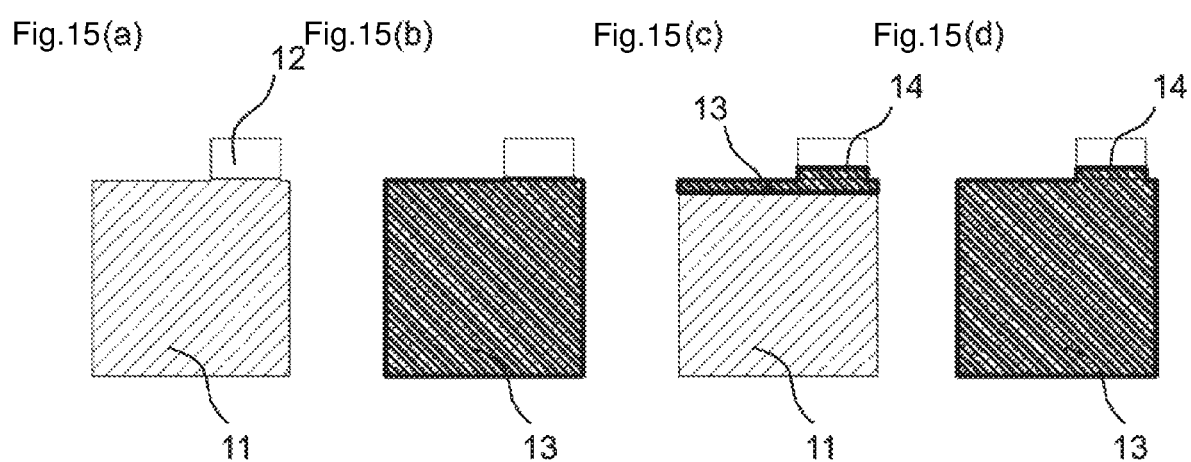

METHOD OF MANUFACTURING BATTERY ELECTRODE AND ELECTRODE MANUFACTURING APPARATUS

CROSS REFERENCE TO RELATED APPLICATIONS

This application is a National Stage of International Application No. PCT/JP2017/011164, filed Mar. 21, 2017, claiming priority based on Japanese Patent Application No. 2016-068340, filed Mar. 30, 2016.

TECHNICAL FIELD

The present invention relates to method of manufacturing battery electrode and electrode manufacturing apparatus.

BACKGROUND ART

Secondary batteries have been widely used as power sources for portable devices such as mobile phones, digital cameras, and notebook PCs, or for vehicle batteries and home batteries. Among them, lightweight lithium-ion secondary battery with high energy density is an energy storage device which is indispensable to life.

Secondary batteries are roughly classified into a wound type and a stacked type. Battery element of the wound type secondary battery has a plurality of times wound structure in a state in which long positive electrode and negative electrode have been superimposed while being separated by separator. Stacked type battery has a structure formed by alternately stacking positive electrodes and negative electrodes with separators.

Secondary battery tends to increase its capacity year by year. Thus, when short circuit occurs the secondary battery would become more high temperature, therefore it is important to improve the safety of secondary battery. To improve the safety of secondary battery, a technique is known for providing an insulating layer on surface of electrode active material layer to prevent short circuit between a positive electrode and a negative electrode (Patent document 1).

Other technique is known for forming insulating layer on an area over both an active material layer surface and an exposed surface of current collector to prevent short circuit at the exposed area of current collecting foil where electrode active material layer has not been applied.

Positive electrode without an insulating layer is shown in FIG. 15 (a). In this example, and the area of the current collector in which positive electrode active material 11 has been formed is depicted in oblique line, area indicated by reference number 12 is a positive active material layer non-formed portion. FIG. 15(b) shows a structure in which insulating layer has been further formed on the positive electrode active material. FIG. 15(c) shows a structure in which an insulating coating area on positive electrode active material 13 and an insulating coating area on positive electrode current collecting foil 14 have been formed partially on an area over both positive electrode active material 11 and active material layer non-formed portion 12. It is noted that, as shown in FIG. 15(d), coating areas 13 and 14 (also referred to as insulating layer 13 and 14) may formed on an area over both almost whole surface of the positive electrode active material and active material non-formed portion.

PRIOR ART DOCUMENT

Patent Document

Patent Document 1: JP-A-119-237,622
Patent Document 2: JP-A-2004-103437

SUMMARY OF INVENTION

Technical Problem

To form an insulating layer on an electrode active material layer formed on a current collecting foil, die coater application may be used for example. In particular, when applying insulating layer slurry of wet thickness of 15 μm, as shown in FIG. 16(a), a gap between current collecting foil 15 and tip of application die 51 is set to about 15 μm, substantially identical to the wet thickness of the slurry. Therefore, insulating layer 14 can be applied evenly.

With respect to surface of positive electrode active material 11, as shown in FIG. 16(b), insulating layer 13 of about 15 μm is applied to positive electrode active material for example of 80 μm. Here, if current collecting foil in an application state of FIG. 16(a) is conveyed and insulating layer is tried to form on the positive electrode active material, tip of the application die interferes with the positive electrode active material 11 since a gap between current collecting foil and tip of application die is thinner than positive electrode active material 11.

Instead of the above application method, if gap is set to large from the start (in other words, a distance between current collecting foil and tip of application die is set to about sum value of a thickness of positive electrode active material and wet thickness of slurry, 95 μm for example), then insulating layer may not be formed evenly because of too long distance between current collecting foil and tip of die as shown in FIGS. 16(c) and 16(d). In particular, there was a problem that insulating material would become not continuous but discontinuous and spotted layer.

Present inventions have been proposed base on the above problem and it is its objective to provide a method of manufacturing electrode and the like that can form continuous layer without forming spotted layer, even when forming a second layer so that it can cover at least a part of electrode active material intermittently formed on current collecting foil and a part of exposed area in which no electrode active material formed.

Solution to Problem

To achieve the above objective, method of manufacturing electrode according to embodiment of the present invention is as follows:

A method of manufacturing an electrode, comprising the steps of:
  forming a first layer by intermittently applying a layer to a current collecting foil with thickness of 40 μm or more and 300 μm or less; and
  forming a second layer, wherein the second layer is formed both on a region where the first layer has been formed on the current collecting foil and an exposed region where the current collecting foil is exposed without being formed the first layer, and wherein a thickness of the second layer is 1 μm or more and 30 μm or less, and, length of the second layer on the first layer is 1 mm or more and length of the second layer on the exposed region is 1 mm or more;

wherein in the step of forming of second layer, providing a gap of 40 μm or more between am applying part of application apparatus and the current collecting foil, based on a positional information of the first layer, from during applying a layer to the exposed region to during applying a layer to the first layer.

Advantageous Effect of Invention

According to the present invention, it is possible to provide a method of manufacturing electrode and the like that can form continuous layer without forming spotted layer, even when forming a second layer so that it can cover at least a part of electrode active material intermittently formed on current collecting foil and a part of exposed area in which no electrode active material formed.

BRIEF DESCRIPTION OF DRAWINGS

FIGS. 15(a) to 15(d) show several embodiments example of electrode.

DESCRIPTION OF EMBODIMENTS

Here, embodiments of the present inventions will be described as referring to drawings. First, an example of configuration of secondary battery which is manufactured by a method of the present invention will be described.

(Secondary Battery)

Figure 1:
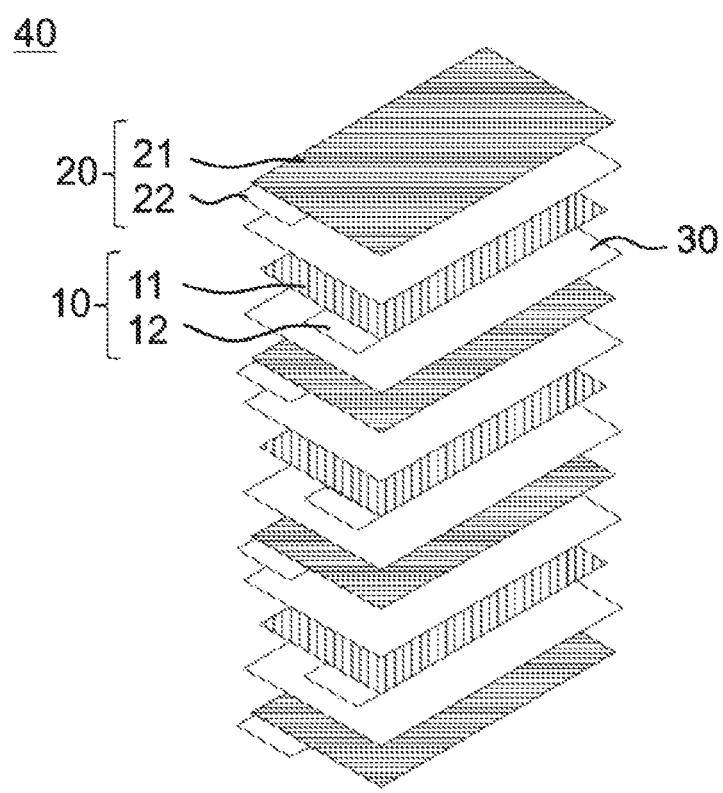
FIG. 1 is a perspective view showing one example of configuration of disassembled battery element of stacked-type battery.
Figure 2A:
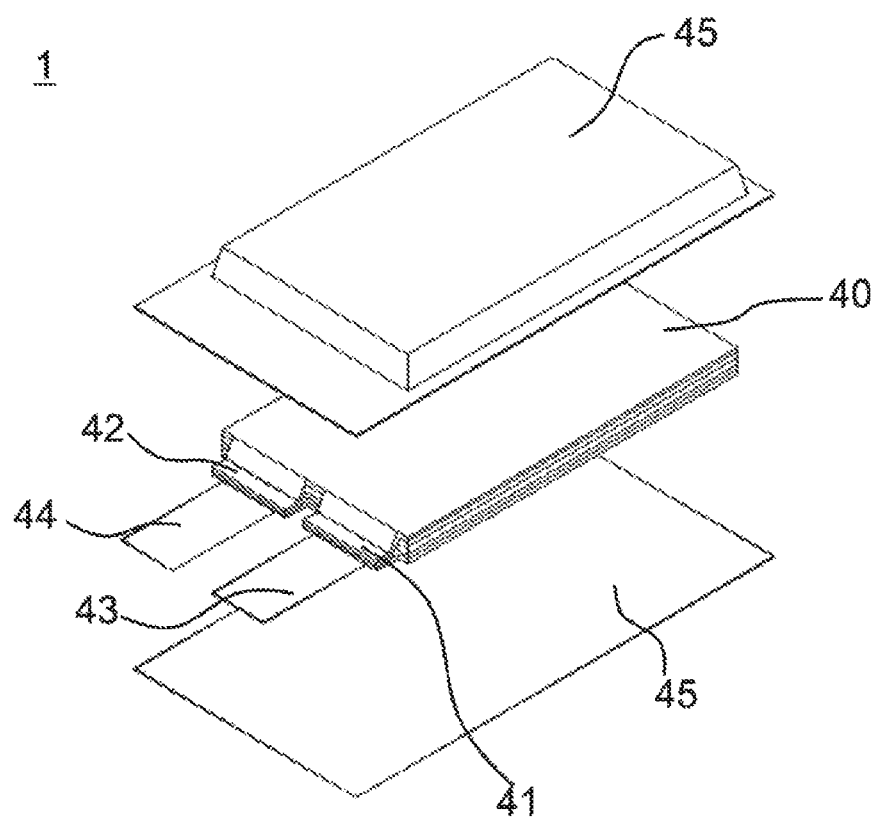
FIG. 2A is a perspective view showing one example of configuration of disassembled stacked-type battery.
Figure 2B:
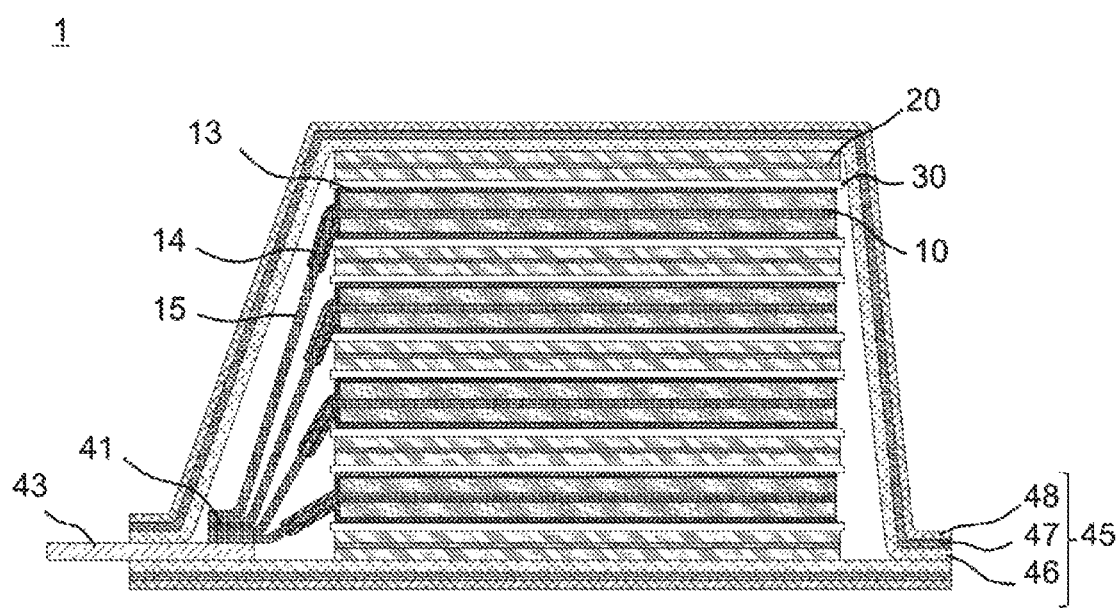
FIG. 2B is a sectional view schematically showing battery configuration.

A lithium ion secondary battery 1 comprises a battery element 40 and an outer container 45 enclosing it with electrolyte as shown in FIGS. 1, 2A and 2B. The stacked-type battery element 40 of the secondary battery 1 has a configuration in which positive electrodes 10 and negative electrodes 20 are stacked alternatively with inserting separators 30 for insulation as shown in FIG. 1.

Positive electrode 10 has a current collector on which active material and the like has been applied. Positive electrode 10 has a positive active material formed portion 11 and a positive active material layer non-formed portion 12 on which active material is not applied for forming a lead part. Similarly, negative electrode 20 has also a current collector on which active material and the like has been applied, and it has a negative material formed portion 21 and a negative active material non-formed portion 22.

Active material non-formed portions 12 are bundled by ultrasonic bonding or the like to form a positive electrode lead 41 as shown in FIG. 2A. Similarly, negative active material non-formed portions 22 are bundled to form a negative electrode lead 42. Positive terminal 43 and negative terminal 44 are electrically connected to the positive electrode lead 41 and negative electrode lead 42, respectively.

Positive current collecting foil 15 from positive active material 11 to positive electrode lead 41 is configured to pass through vicinity of the negative electrode 20 as shown in FIG. 2B. However, since insulating layer 14 is applied over an area from an edge of the positive active material to 1 mm or more area, short-circuiting between the negative electrode 20 and positive electrode current collecting foil 15 can be prevented. Such a structure as area from the edge of positive active material to 1 mm or more is coated by insulating layer 14, may be provided only on one surface of the current collecting foil 15 (surface facing to a negative electrode), however, may preferably be provided on both sides. Areas from edge of positive active material to 2 mm or more, or 3 mm or more may be coated with the insulating layer 14. Thickness of the insulating layer may be constant for example.

Thickness of electrode active material layer varies depending on such as battery capacity or battery output and material of active material, however, usually it is in the range of approximately 40 μm to 300 μm (40 μm or more and 300 μm or less).

Insulating layers 13 and 14 have been formed on an upper layer of the electrode active material layer. Thickness of the insulating layer is preferably 1 μm or more to keep insulation performance. However, since too thick insulating layers would negatively affect battery performance, thickness of the insulating layers is preferably 30 μm or less.

Insulating layer can be formed for example by dispersing insulating particles and binder in a solvent to prepare insulating slurry, and by applying it on an electrode active material layer at a thickness (wet thickness) of 15 μm with a coater, and by drying solvent in a drying furnace for dry thickness of 10 μm, and by pressing it with a roll press machine or the like to obtain thickness of 5 μm.

Battery element 40 is packed within the outer container 45 so that positive terminal 43 and negative terminal 44 extend outside of the outer container 45. It is noted that conventionally known material or structure can be used for the outer container 45. For instance, a film member can be used in which an inner layer 46 made of heat fusion resin, a metal layer 47 made of aluminum foil, and an outer layer 48 made of protective resin have been laminated.

With respect to a procedure of manufacturing battery (except for preparing electrodes), basically, conventionally known method can be used. Specifically, prepared positive electrode 10, negative electrode 20 and separator 30 are alternatively stacked to obtain a battery element 40 as shown in FIG. 1. Then, as shown in FIG. 2A, the battery element 40 to which a positive terminal 43 and a negative terminal 44 have been electrically connected will be packed within an outer container 45 together with electrolyte to obtain a battery 1.

Figure 3:
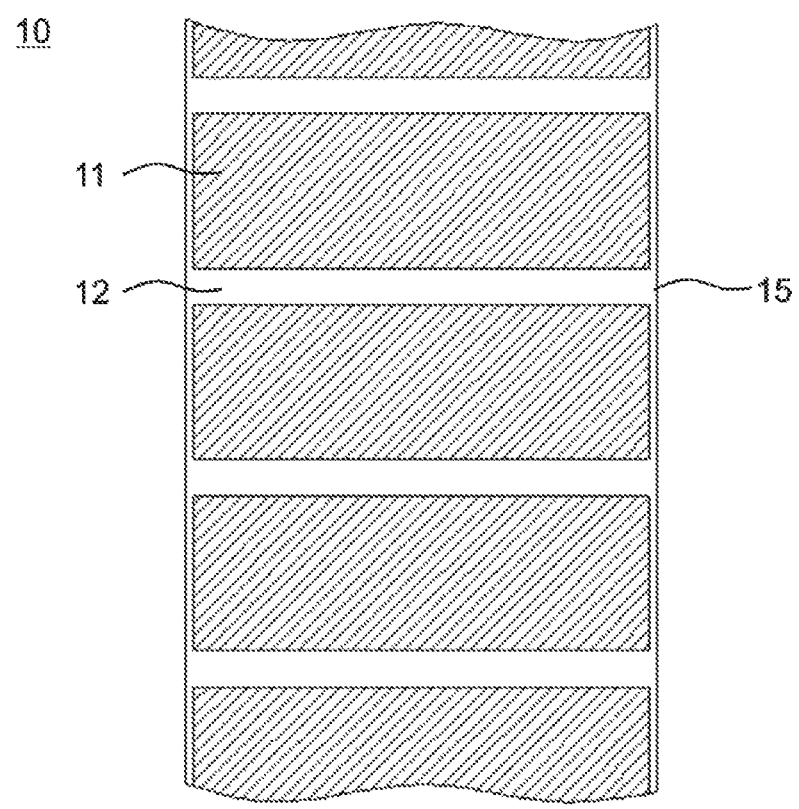
FIG. 3 is a plan view showing one example of intermittently applied positive electrode.

Manufacturing electrodes will be described as an example of positive electrode 10. As shown in FIG. 3, first, positive electrode 10 is formed by intermittently applying positive electrode active material 11 to a long current collecting foil 15 for positive electrode. The positive electrode active material 11 is applied at a predetermined thickness by using an application (in particular, a die coater or the like). In FIG. 3, an exposed area, on which no positive electrode active material 11 is applied, is indicated by reference number 12.

First Embodiment

Figure 4:
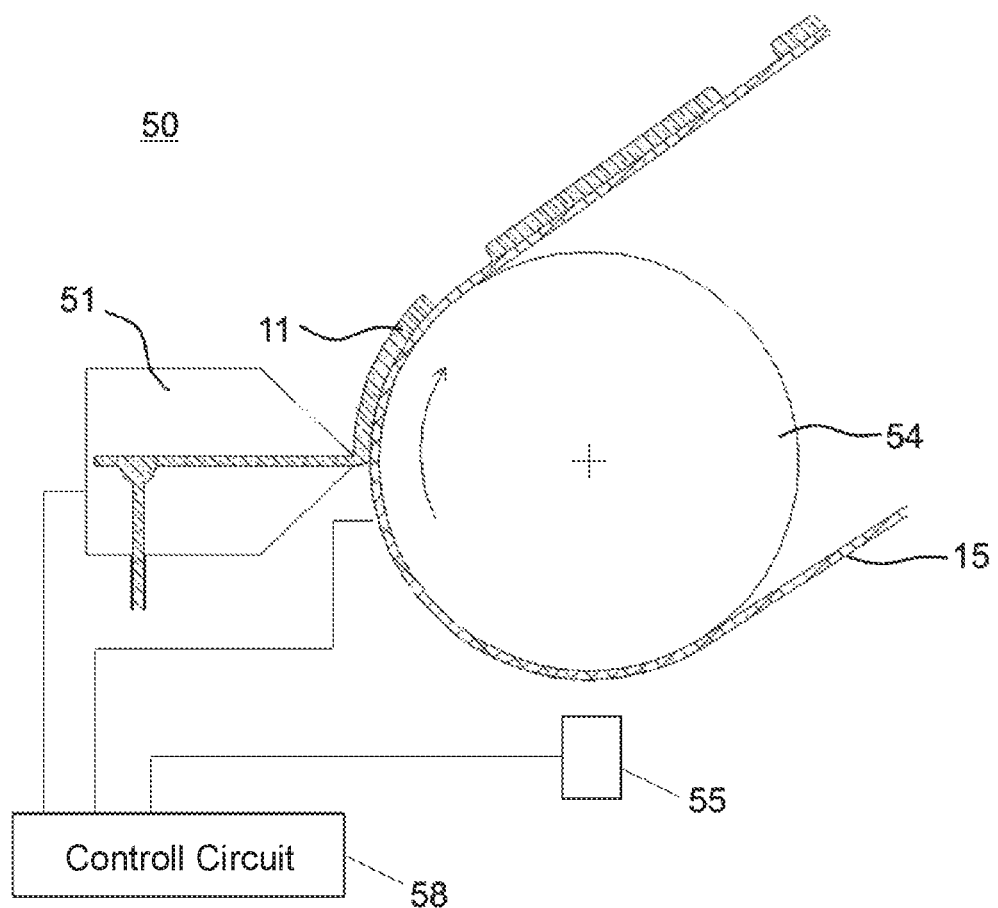
FIG. 4 shows one example of method of manufacturing electrode and apparatus according to one embodiment of present embodiment.

Next, an example of manufacturing electrode according to one embodiment of the present invention will be described specifically. FIG. 4 is a drawing schematically showing a configuration example of die coater.

As shown in FIG. 4, die coater 50 comprises at least one back-up roller 54 on which a current collecting foil 15 is carried and an application die 51 disposed so that it faces an surface of the current collecting foil 15. Application die is configured to be movable forwardly and backwardly with respect to the back-up roller 54. More specifically, it can be configured to reciprocate linearly along a direction substantially parallel to a radial direction of back-up roller 54.

Die coater 50 also comprises a driving mechanism (not shown), having an actuator and a link mechanism and the like, for moving the application die 51 forwardly and backwardly, an injecting mechanism for injecting material via a nozzle of application die 51, and a control circuit 58 for controlling operation thereof. Control circuit 58 may be configured to control operation of back-up roller 54 and/or other driving roller (not shown). Control circuit 58 may include a micro-computer with a CPU, a memory and the like, which is to be controlled by a computer program.

Positive current collecting foil 15 is a long member pulled out form a roll (not shown), and is to be conveyed in a state in which it has been carried by the back-up roller 54 and the like (not shown). Control circuit 58 implements a position control of application die 51 at a predetermined timing in accordance with rotation of the back-up roller 54, and an injection control, then positive electrode active material 11 will be applied on a current collecting foil 15. In this example, intermittent application will be implemented.

Electrode, on which active material has been applied, is dried in in a drying furnace for evaporation of solvent, and then pressed by a roll press machine.

Figure 5A:
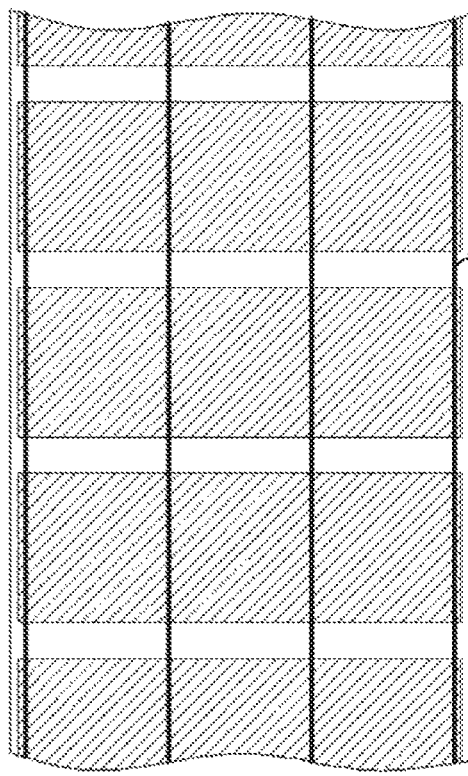
FIGS. 5(a) to 5(c) show processes of manufacturing battery electrode by using intermittently applied electrode.
Figure 5B:
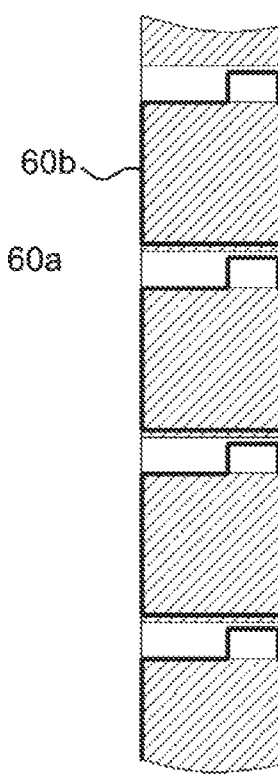
Figure 5C:
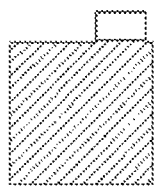

As an example as shown in FIG. 5($a$), current collecting foil 15 is cut along a cut-line 60$a$ parallel to its longitudinal direction to separate a plurality of long members (this process can be referred to as slitting). Then, as shown in FIG. 5($b$), a shape along an electrode cut-line is cut off to thereby finally obtain an electrode as shown in FIG. 5($c$). It is noted that negative electrodes can be manufactured in the same way as the positive electrodes.

Figure 6:
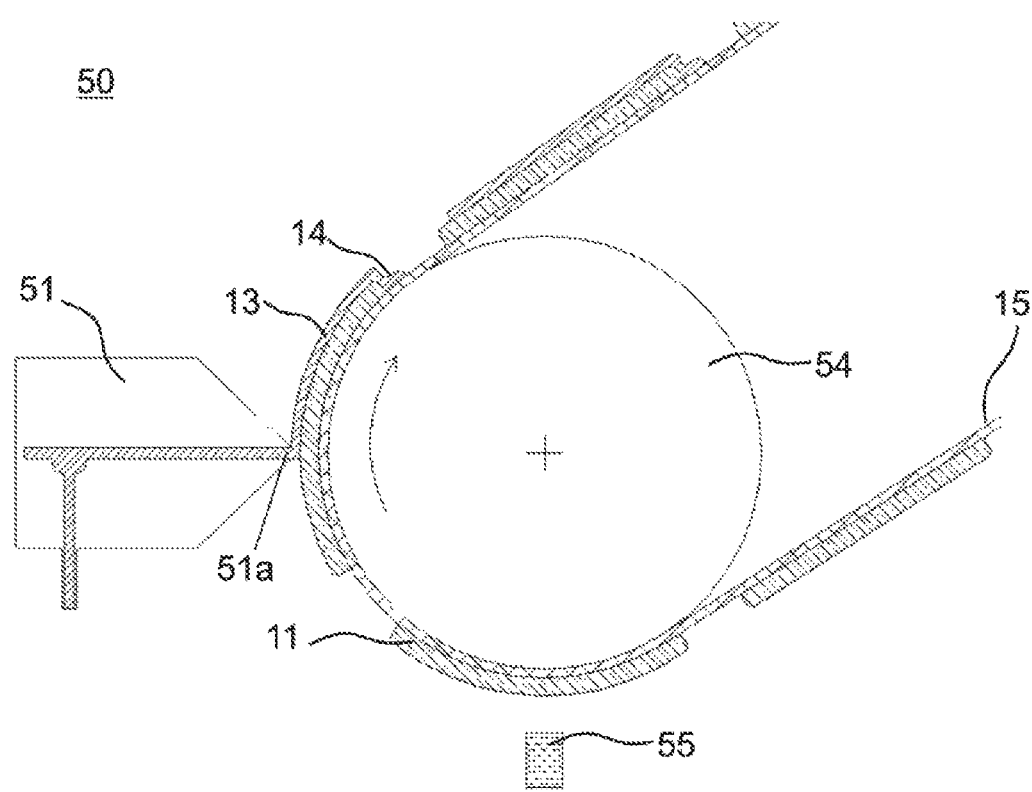
FIG. 6 shows example of operation of FIG. 4 apparatus.
Figure 7A:
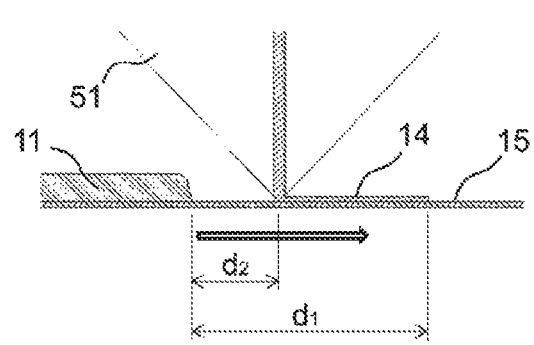
FIGS. 7(a) and 7(b) show example of applying positive electrode active material layer and insulating layer.
Figure 7B:
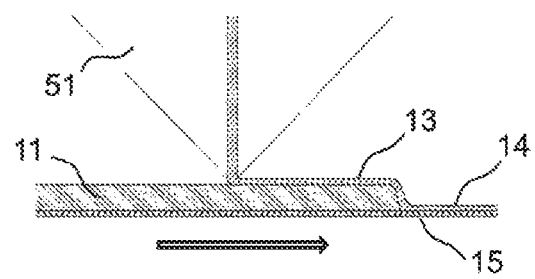

FIG. 6 and FIGS. 7($a$) and 7($b$) show an example of manufacturing battery electrodes according to one embodiment of the present invention. In a state of FIG. 6, a current collecting foil 15 is carried by a back-up roller 54, wherein positive electrode active material 11 have been intermittently applied to one surface (one example) of the current collecting foil 51 in advance at a predetermined interval. In this example, a detector 55 is provided as a one part of the die coater 50. Detector 55 is a device for detecting whether active material layer 11 is formed or not on a current collecting foil during transport. As an example, device that detects a thickness of a layer and/or existence of layer (for example optical type, in particular a device using laser) can be used, or imaging device (for example CCD camera or the like) can be used.

Detector 55 is electrically connected to a control circuit 58 (see FIG. 4). Control circuit is configured to implement predetermined controls of objects based on detection result of the detector 55.

FIGS. 7($a$) and 7($b$) are schematic drawings showing a flattened current collecting foil 15 instead of curved current collecting foil to easily understanding the state of FIG. 6. As shown in this example, basically, second layer (insulating layer) 14 is applied over both an area where positive electrode active material 11 is formed and an area where positive electrode active material 11 is not formed and the current collecting foil is exposed.

It is noted that whole surface of both the positive electrode active material 11 and the exposed area of current collecting foil are not necessarily covered. As shown in FIG. 6, a configuration may be used in which insulating layer 14 is not formed on a part of the exposed area. However, a certain area that includes at least an edge of the positive electrode active material 11 may preferably be covered with the insulating layer 14.

Insulating layer 14 is formed on the exposed area of current collecting foil at a length of 1 mm or more (in other words, a distance from the edge of active material layer 11 is 1 mm or more). FIG. 7($a$) shows a status in which coating of insulating layer 14 has been started from a position, wherein the position is a predetermined distance $d_1$ away from the edge of active material layer 11 along a right direction of the drawing, and then the distance between die tip and positive electrode active material has become $d_2$. It is noted that a length of the insulating layer 14 formed on active material layer 11 is 1 mm or more.

With respect to upper or lower direction of the drawing, a gap between the tip of application die 51 and current collecting foil 15 is set to a certain distance thinner than the thickness of positive electrode active material 11. In particular, 1 μm or more and 30 μm or less is preferable in one embodiment. If the current collecting foil 15 is conveyed along an arrow direction in the shown status, the tip of application die would interfere with the positive electrode active material 11. Therefore, the following operation control will be used in a structure of the present embodiment.

Specifically, at timing when the current collecting foil 15 has been conveyed by a predetermined distance from the FIG. 7($a$) status, control circuit 58 controls an operation of driving mechanism (not shown) so that the application die 51 is move toward a direction away from the current collecting foil 15 by a certain distance. Certain distance may be set to such a distance that the tip of application die 51 does not interfere with the positive electrode active material 11. For instance, a distance of sum of a thickness of positive electrode active material 11 and a thickness of layer to be formed on the layer (wet thickness of insulating layer) may be used. As a specific example, gap between current collecting foil 15 and tip of application die 51 may be a value, about 95 μm, obtained by adding wet thickness 15 μm of the insulating layer 14 to thickness of positive electrode active material 11 (for example 80 μm).

With respect to timing for moving application die 51, it may be set to proper timing, however, it is preferable that a trigger information is generated based on a position information of the positive electrode active material 11. Such position information may be obtained by using detection result of the detector 55. At a phase of forming an insulating layer on the positive electrode active material, the controller circuit 58 controls the application die 58 so that it retreats from back-up roller 64 by 40 µm or more, and continues applying against the positive electrode active material to thereby form an insulating layer of predetermined thickness on the positive electrode active material.

At a next phase of forming an insulating layer on the positive electrode active material, application die 51 is then controlled to move forwardly to the back-up roller 54 to form an insulating layer of predetermined thickness.

By repeating the above operation process, insulating layer is formed on both the exposed area of current collecting foil and positive electrode active material.

According to the method of manufacturing electrode according to the present embodiment, even in a case that a second layer is applied over a current collecting foil on which a first layer of thickness of 40 µm or more has been intermittently applied, it is possible to form the second layer with almost constant thickness on both an area in which the first layer exists and an area in which the layer does not exist. If application on both areas in which the first layer exists and does not exist is implemented at the constant distance (for example 95 µm) between current collecting foil and tip of application die, the tip of die become too away from the current collecting foil in an area where the first layer does not exist, which could result in spotted and discontinuous layer. By contrast, according to the present embodiment, a distance between the tip of die an current collecting foil in an area where the first layer does not exist is set to almost the same distance as a thickness of layer to be formed, then application die is move by 40 µm or more in an area where the first layer has been formed. As a result, interference between die and the first layer is prevented, and, second layer of the predetermined thickness can be formed continuously over the first layer. It is noted that thickness of the seconded layer may be same for an area where the first layer does not exist and the first layer, however, different thickness may be used.

Although the present invention has been described in an invention category of method of manufacturing electrode, the present invention can be considered as inventions of electrode manufacturing apparatus and computer program for electrode manufacturing apparatus.

In the above example, application die movable forwardly and backwardly has been described, however, the present invention in not limited thereto. For instance, adjusting mechanism of gap distance between a tip of application die and current collecting foil can be used, in which a tip of die can be expanded and retreated, an angle of die can be changed, a back-up roller can be moved, or combination thereof and the like can be used.

Abovementioned manufacturing method can be used for manufacturing negative electrode 20 as well. Insulating layer may be formed on at least one of positive electrode 10 and negative electrode 20, and may be formed on both sides.

Although in the example of FIG. 6 and the like positive electrode active material 11 is formed only on one side of the positive electrode current collector 15, however, positive electrode active material 11 and insulating layer 13 and 14 may be formed on both sides.

In the drawings, each thickness of the positive electrode current collecting foil, positive electrode active material, and insulating layer depicted exaggeratedly to help understanding the structure, therefore actual dimension of electrode thickness is not shown.

Second Embodiment

Figure 8A:
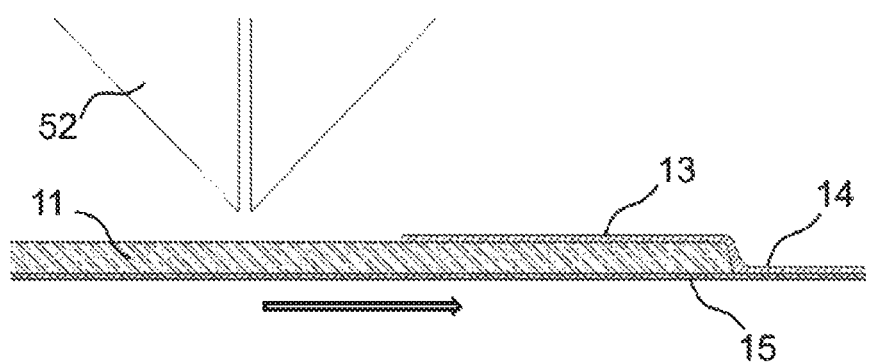
FIGS. 8(a) and 8(b) show other example of applying positive electrode active material layer and insulating layer.

FIG. 8 (a) shows a state in which a gap between tip of application die 52 and current collecting foil 15 has been increased after applying insulating layer 13 to positive electrode active material 11 over a length of 1 mm or more. Specifically, tip of the application die 52 become more distant from a surface of the positive electrode active material 11. As such, by increasing gap (for example, retreating the application die 52), advantageously it can be prevented that too much insulating layer as a second layer (as an example) adheres to a positive electrode active material 11.

Figure 8B:
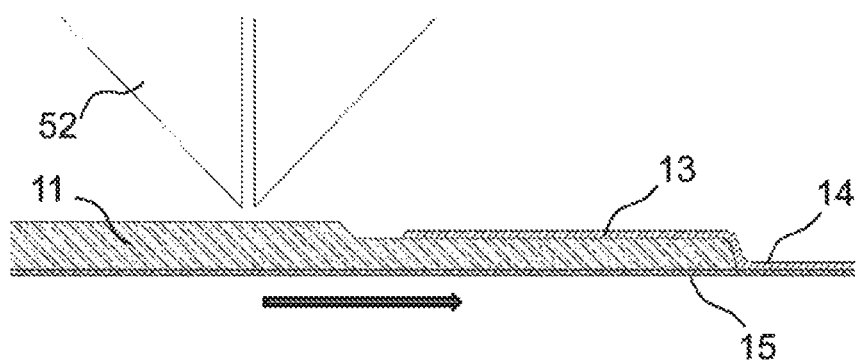

In other embodiment, if there are two areas, relatively thin first area and relatively thick second area as a result of a step of the positive electrode active material 11, as shown in FIG. 8(b), it is possible to further increase the gap in order to avoid this step after applying the insulating layer 13. It is noted that when insulating layer is provided against a constant-thickness positive electrode active material layer, only the portion where the insulating layer has been formed becomes thick, and then step would be generated, therefore a gap as above is formed in order to prevent it. Accordingly, as an example, thickness of the relatively thick second area may be set to a thickness that can be obtained by adding a thickness of insulating layer to a thickness of the relatively thin first area. Such a configuration can make uniformity of upper surface of the positive electrode active material and the insulating layer.

Third Embodiment

Figure 9:
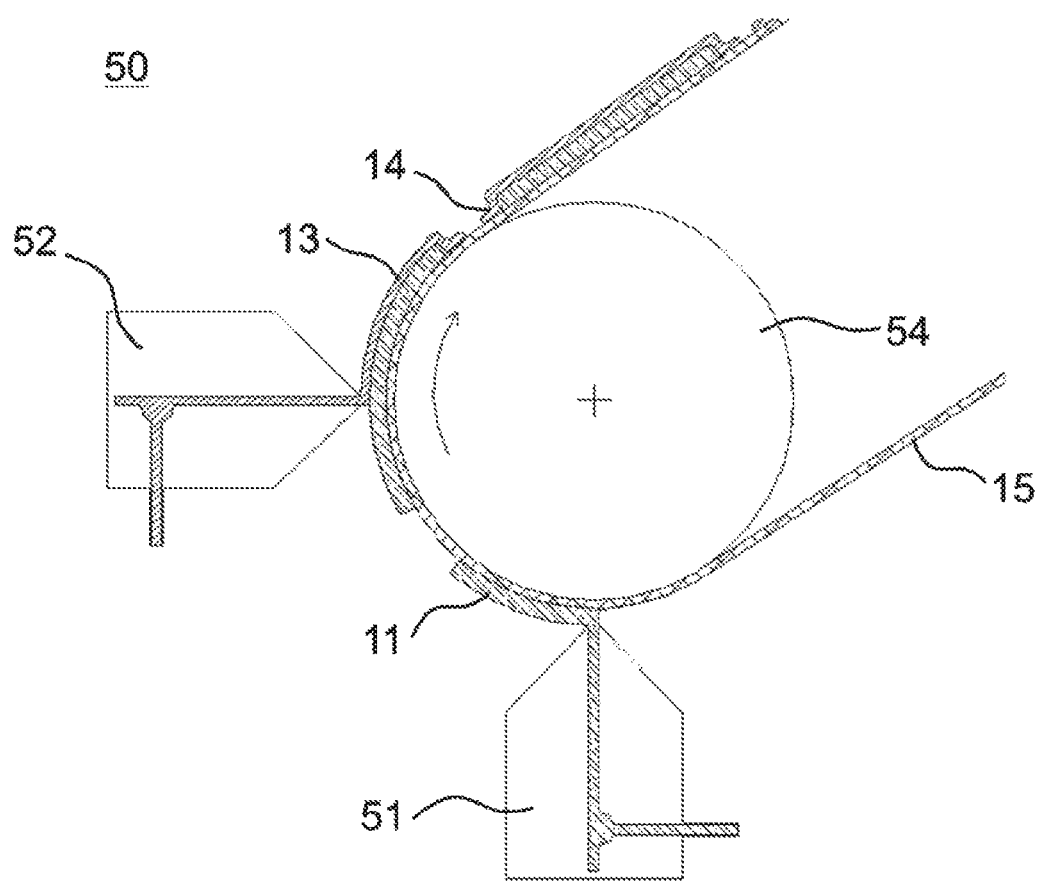
FIG. 9 shows other example of method of manufacturing electrode and apparatus for applying positive electrode active material layer and insulating layer.

FIG. 9 shows a method of manufacturing electrode according to an embodiment of the present invention in accordance with the substantially same manufacturing process as FIG. 6. In FIG. 9, two application dies 51 and 52 have been provided around one back-up roller 54.

First application die 51, disposed at upstream area along a conveying direction, is to apply positive electrode active material 11. Second application die 52, disposed at downstream area relative to the first die 51, is to apply second layer (insulating layer) 14. Control circuit, not shown, controls application operations of each die 51 and 52 (timing of application and position-adjustment for die).

According to such a configuration, by operating the second application die 52 at a predetermined time corresponding to an application timing of the first application die 51, it is possible to form an insulating layer 14 of a predetermined thickness on a predetermined area above the current collecting foil and active material. In other words, thanks to a configuration in which the second application die 52 is configured to operate in cooperation with the first application die 51, more specifically, the second application die 52 is configured to implement a continuous application after increasing a gap between the tip of die and current collecting foil at 40 µm or more when applying positive electrode active material layer, similarly to the above-mentioned embodiment, continuous insulating layer can be formed, instead of forming spotted and discontinuous layer.

The same positioning control and application control for application dies 51 and 52 may be used as the above embodiment.

With respect to the positioning control of first application die 51, to form a step of positive electrode active material 11 (see FIG. 8(*a*)), application die 51 may be retreated by a predetermined distance (as an example) at a position where a step should be formed. Understandably, it is noted that the same effect can be obtained by changing a position of back-up roller 54. Furthermore, application die 51 may be configured to retreat linearly. Or, tip of die may be configured to retreat from the current collecting foil, when application die 31 pivots slightly around a predetermined rotation axis (for example, an axis parallel to a center axis of the back-up roller).

Fourth Embodiment

Figure 10:
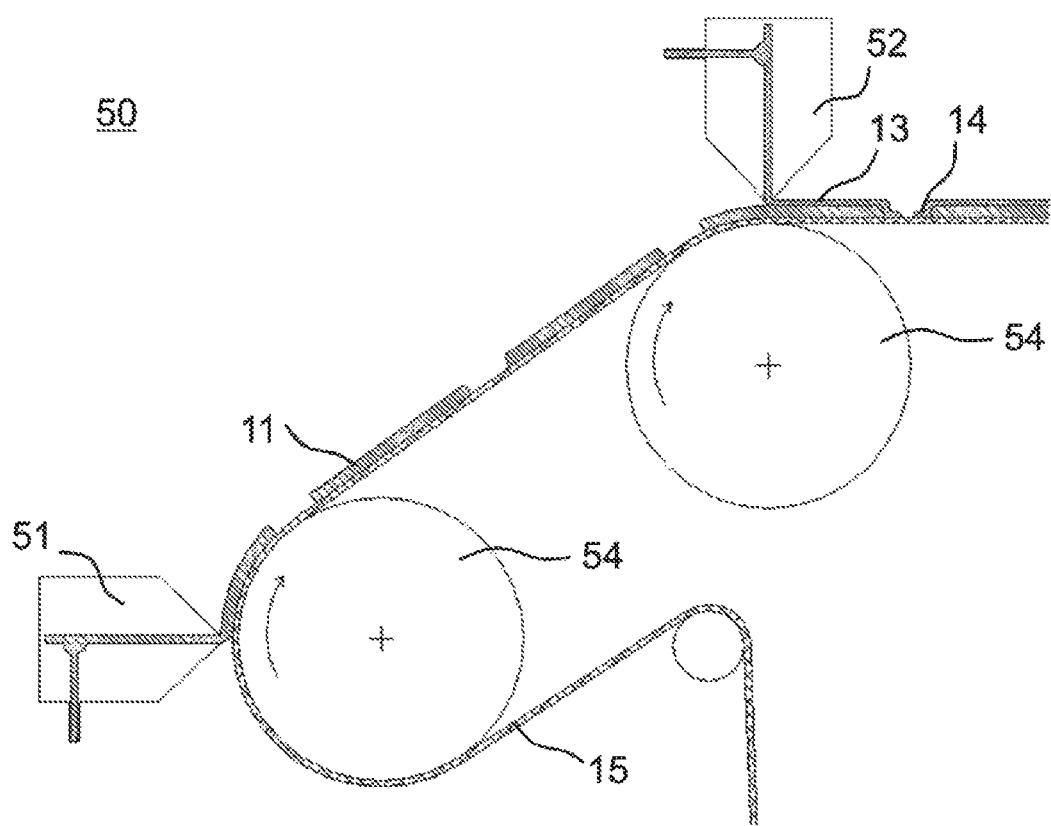
FIG. 10 shows further other example of method of manufacturing electrode and apparatus for applying positive electrode active material layer and insulating layer.

FIG. 10 shows other method of manufacturing electrode according to the one embodiment of the present invention. In FIG. 10, two back-up rollers are provided.

A first application die 51 is disposed at the firs back-up roller 54 and a second back-up roller 54 is disposed at the second back-up roller 54. Both of application dies 51 and 52 are connected to a control circuit, not shown, to be controlled by it.

In this configuration, the first application die 51 intermittently applies positive electrode active material 11 at the upstream first back-up roller 54, then the second application die 52 applies insulating material to form an insulating layer 14 at the downstream second back-up roller 54. Even such a configuration can obtain the same elect as above by controlling the second application die 52 in a similar was as mentioned in the above embodiment.

It is noted that the second application die 52 may be configured to operate interlocking with the first application die 51. Alternatively, the second application die 52 may be controlled based on a detection result of a certain sensor (not shown, sensor for detecting an existence of a positive electrode active material and/or sensor for detecting thickness of a positive electrode active material).

Figure 11:
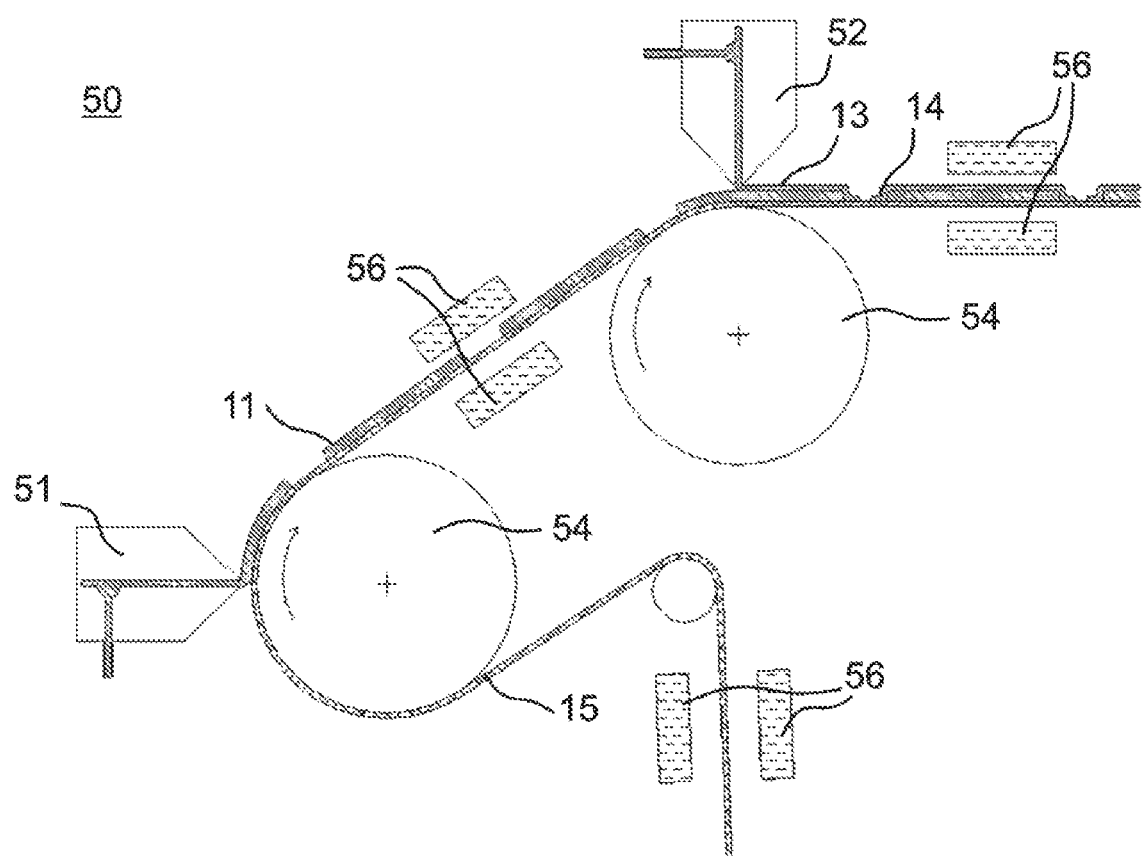
FIG. 11 shows another example of method of manufacturing electrode and apparatus for applying positive electrode active material layer and insulating layer.

FIG. 11 shows a modified embodiment of the above apparatus. In this apparatus, three layer thickness measuring device 56 are provided. First layer thickness measuring device 56 is disposed at an upward of the first roller 54, second layer thickness measuring device 56 is disposed between the first roller 54 and the second roller 54, and third layer thickness measuring device 56 is disposed at a downward of the second roller 54.

For layer thickness measuring device 56, known device such as radiation thickness gauge (beta ray, gamma ray, x ray) and laser thickness gauge may be used. Such a configuration makes it possible to measure thickness of a positive electrode current collecting foil 15, a positive electrode active material 11, and an insulating layer 13 on the positive electrode active material. It is noted that only one or only two of the three layer thickness measuring device can be used.

Figure 12:
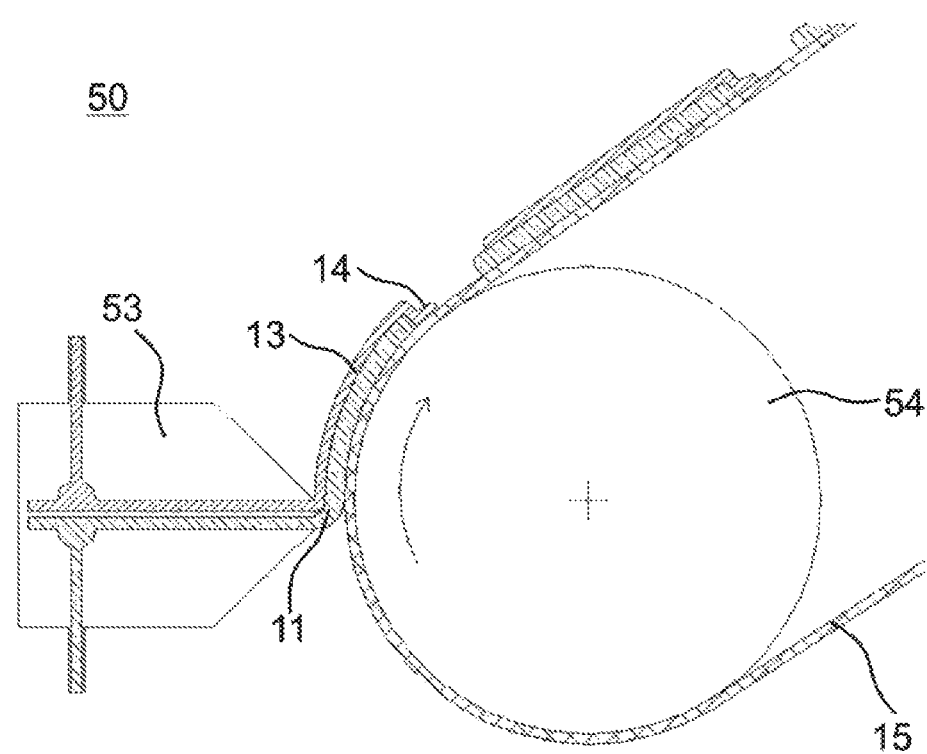
FIG. 12 shows further another example of method of manufacturing electrode and apparatus for applying positive electrode active material layer and insulating layer.

FIG. 12 shows further other method of manufacturing electrode according to the one embodiment of the present invention. In this example, it is configured that just one application die 53 can apply both positive electrode active material 11 and insulating layer 14. The application die 53 has two nozzles and injecting means corresponding thereto (not shown). Each of the injecting means is configured to operate independently.

Figure 13A:
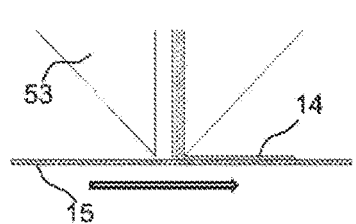
FIGS. 13(a) to 13(c) show application example by FIG. 12 apparatus.
Figure 13B:
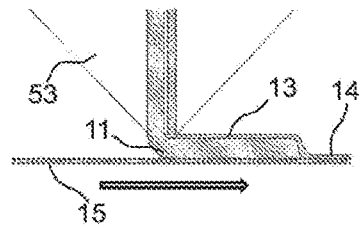
Figure 13C:
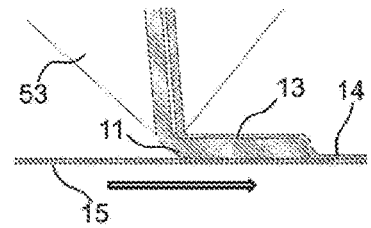

For applying only the insulating layer 14 with application die 53, a gap between a current collecting foil 15 and tip of die may be set to a distance approximately the same to a wet thickness of insulating layer 14, for example 15 μm, as shown in FIG. 13 (*a*).

As shown in FIG. 13(*b*), by increasing a gap (for example 40 μm or more) at a timing of injecting positive electrode active material 11, it is possible to form insulating layer 13 evenly on the positive electrode active material 11.

It is noted that a gap can be changed by retreating the application die 53 as shown in FIG. 13 (*b*), however, it can be achieved by changing an angle of the application die 53 as shown in FIG. 13 (*c*).

Figure 14:
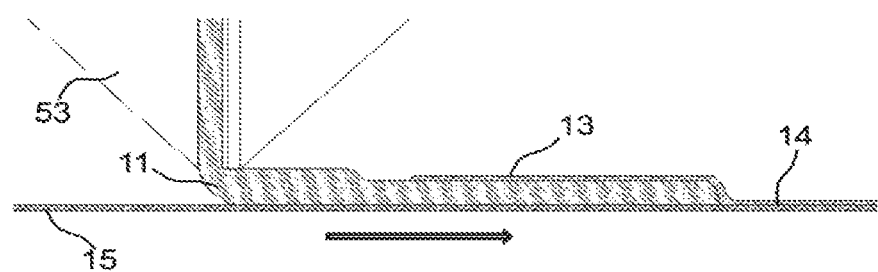
FIG. 14 shows other application example by FIG. 12 apparatus.
Figure 16A:
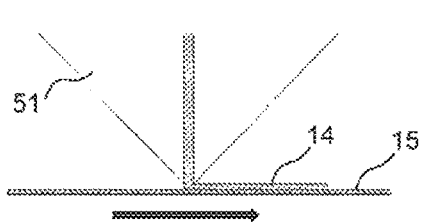
FIGS. 16(a) to 16(d) show conventional example of method of manufacturing an electrode.
Figure 16B:
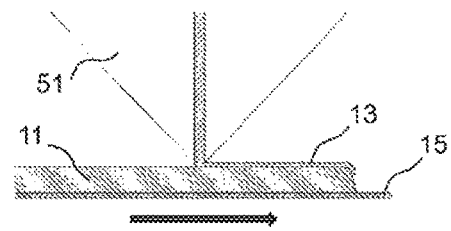
Figure 16C:
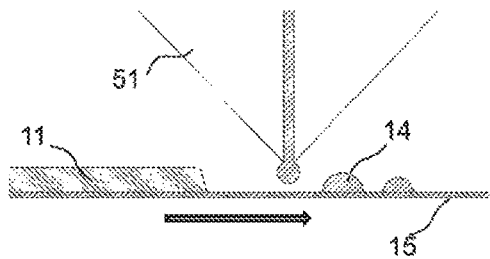
Figure 16D:
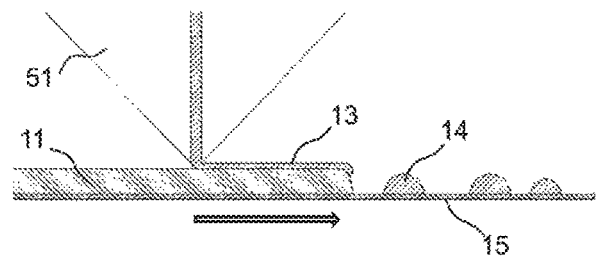

Further, as shown in FIG. 14, application die 54 may be moved to change a gap to the current collecting foil 15 at a step-formed portion so that the step of the positive electrode active material 11 can be made.

Although several embodiments of the present invention have been described above referring to the drawings, present inventions are not necessarily limited to the specific embodiment as mentioned above. The embodiment can be modified properly within the scope of the present invention. In each of the embodiments, common description for the same or corresponding structure or function is omitted, and, it is noted that a technical feature in one embodiment can be combined with other embodiment properly.

(Supplementary Note)

The present application discloses the following inventions. Reference numbers in parentheses are used for reference and not intended to limit the present invention.

1. A method of manufacturing an electrode, comprising the steps of:
   forming a first layer (11) by intermittently applying a layer to a current collecting foil (15) with thickness of 40 μm or more and 300 μm or less; and
   forming a second layer (14), wherein the second layer is formed both on a region where the first layer has been formed on the current collecting foil and an exposed region where the current collecting foil is exposed without being formed the first layer, and wherein a thickness of the second layer is 1 μm or more and 30 μm or less, and, length of the second layer on the first layer is 1 mm or more and length of the second layer on the exposed region is 1 mm or more;
   wherein in the step of forming of second layer, providing a gap of 40 μm or more between an applying part (51*a*) of application apparatus and the current collecting foil, based on a positional information of the first layer, from during applying a layer to the exposed region to during applying a layer to the first layer.

2. The method of manufacturing electrode according to the above, wherein the positional information of the first layer is decided by using detection result of means for detecting the first layer.

3. The method of manufacturing electrode according to the above, wherein the positional information of the first layer is decided by using instruction information for intermittently application of the first layer.

4. The method of manufacturing electrode according to according to the above, wherein applying of second layer is implemented before the first layer dries up after coating the first layer.

5. The method of manufacturing electrode according to according to the above,
   wherein in the step of forming first layer, thickness of first layer for an area on which the second layer is not applied is increased by changing a gap distance between the applying part (51*a*) of the application apparatus and the current collecting foil so that there can be a difference between a thickness of an first layer area on which the second layer is not formed and a thickness of another first layer area on which the second layer is formed.

6. The method of manufacturing electrode according to according to the above, wherein the second layer contains at least insulating particles.

7. The method of manufacturing electrode according to according to the above, wherein the second layer is formed on almost all surface of the first layer (for example, 90% or more of the first layer area).

8. The method of manufacturing electrode according to according to the above, wherein the application apparatus is a die coater.

9. An electrode manufacturing apparatus, comprising:
a conveyer mechanism (54) for conveying a current collecting foil;
a coating die (51) for applying material to the current collecting foil; and
a control circuit (58) for implementing a position control of the coating die;
wherein the control circuit is configured to control a position of the coating die based on a positional information of the first layer, when applying a second layer to at least an upper layer of the first layer that exist intermittently on the current collecting foil so that a gap of 40 μm or more can be provided between a applying part (51*a*) of the coating die and the current collecting foil from during applying a layer to the exposed region to during applying a layer to the first layer.

10. The electrode manufacturing apparatus according to the above, further comprising:
first and second back-up rollers as the conveyer mechanism; and
first and second coating dies corresponding to each of the buck-up rollers,
wherein the control circuit is configured to implement position controlling of the second coating dies.

Computer programs and storage medium storing the computer programs for carrying out the above manufacturing method on an apparatus.

EXPLANATION OF REFERENCES 1 battery
10 positive electrode
11 positive electrode active material
12 active material layer non-formed portion
13, 14 insulating layer
15 positive electrode current collector
20 negative electrode
21 negative electrode active material
22 active material layer non-formed portion
30 separator
40 battery element
41 positive electrode lead portion
42 negative electrode lead portion
43 positive electrode terminal
44 negative electrode terminal
45 outer container
46 inner layer
47 metal layer
48 outer layer
50 die coater
51, 52, 53 application die
54 back-up roller
55 applied portion detector
56 layer thickness measuring device
58 control circuit

The invention claimed is:

1. A method of manufacturing an electrode, comprising the steps of:
   forming a first layer by intermittently applying the first layer to a current collecting foil, wherein the first layer has a thickness of 40 μm or more and 300 μm or less; and
   forming a second layer, wherein the second layer is formed both on a region where the first layer has been formed on the current collecting foil and on an exposed region where the current collecting foil is exposed without the first layer being formed on the current collecting foil, and wherein a thickness of the second layer is 1 μm or more and 30 μm or less, and, a length of the second layer on the region where the first layer has been formed is 1 mm or more and a length of the second layer on the exposed region is 1 mm or more;
   wherein in the step of forming of the second layer, providing a gap of 40 μm or more between an applying part of an application apparatus and the current collecting foil, wherein the gap is provided based on a position of the first layer and during a time when the second layer is formed on the exposed region to a time when the second layer is formed on the first layer.

2. The method of manufacturing the electrode according to claim 1, wherein the position of the first layer is determined using a detector for detecting the first layer.

3. The method of manufacturing the electrode according to claim 1, wherein the position of the first layer is determined based on a control instruction for controlling the intermittent application of the first layer to the current collecting foil.

4. The method of manufacturing the electrode according to claim 1, wherein forming the second layer is implemented before the first layer dries after applying the first layer.

5. The method of manufacturing the electrode according to claim 1,
   wherein the step of forming the first layer comprises changing a gap distance between the applying part of the application apparatus and the current collecting foil to form the first layer with a first thickness for an area on which the second layer is not formed, wherein the first thickness has a different thickness than a second thickness of the first layer formed for an area on which the second layer is formed.

6. The method of manufacturing the electrode according to claim 1, wherein the second layer contains at least insulating particles.

7. The method of manufacturing the electrode according to claim 1, wherein the second layer is formed on substantially an entire exposed surface of the first layer.

8. The method of manufacturing the electrode according to claim 1, wherein the application apparatus is a die coater.

* * * * *